United States Patent [19]

Christ et al.

[11] Patent Number: 4,613,073
[45] Date of Patent: Sep. 23, 1986

[54] COMPOUND GLASS PANE CONSTRUCTION AND METHOD FOR HEATING THE SAME

[75] Inventors: Hubertus Christ, Stuttgart; Helmut Wulf, Ostfildern, both of Fed. Rep. of Germany

[73] Assignee: Daimler-Benz Aktiengesellschaft, Fed. Rep. of Germany

[21] Appl. No.: 760,616

[22] Filed: Jul. 30, 1985

Related U.S. Application Data

[63] Continuation of Ser. No. 225,991, Jan. 19, 1981, abandoned.

[30] Foreign Application Priority Data

Jul. 17, 1980 [DE] Fed. Rep. of Germany ....... 3001565

[51] Int. Cl.$^4$ ............................................. B60H 1/02
[52] U.S. Cl. ................................ 237/12.3 R; 165/41; 165/104.21

[58] Field of Search ................... 237/12.3 A, 12.3 R; 98/2, 2.05, 2.08, 2.09; 165/41, 104.21, 104.14; 52/171

[56] References Cited

U.S. PATENT DOCUMENTS 2,386,339 10/1945 O'Connor ............................ 52/117
3,018,087 1/1962 Steele .................................. 126/417

FOREIGN PATENT DOCUMENTS 2358892 6/1975 Fed. Rep. of Germany ........ 52/171

Primary Examiner—Henry Bennett
Attorney, Agent, or Firm—Craig & Burns

[57] ABSTRACT

A multiple-glass pane heatable from an interstice between the panes and a process for heating the multiple-glass pane. The interstices between the panes constitutes a condensation zone of a flat heat pipe with the heat supply being effected by vapors condensing between the respective panes.

29 Claims, 4 Drawing Figures

COMPOUND GLASS PANE CONSTRUCTION AND METHOD FOR HEATING THE SAME

This is a continuation of application Ser. No. 225,991, filed Jan. 19, 1981, now abandoned.

The present invention relates to a glass pane construction, and, more particularly, to a compound glass pane construction and a process for heating the same wherein a compound glass pane, especially for motor vehicles, is heated from an interstice between the panes of glass.

While it has been proposed to heat panes of glass by exposing them to a flow of preheated air, disadvantages of such proposals, especially with thick windows, resides in the fact that the flow of preheated air is frequency insufficient and, additionally, relatively-expensive air conduits are required for directing the flow of the preheated air.

To avoid the above-noted disadvantages, several constructions have been proposed for heating a viewing window of a dual construction, i.e., a double-glass pane from an interstice between the panes. For example, in U.S. Pat. No. 1,650,922 and German Pat. No. 883,712, it has been proposed to inject hot air into the interstice; however, due to the dust component in the air, voluminuous filters are required to preclude contamination of the window. Additionally, in case of a failure of the filter, contaminations as well as condensing oil mists are practically unavoidable so that such heating units could not become popular. While it has been suggested to make one-half of the pane removable for cleaning purposes, such suggestion has failed to find acceptance in practice.

It has also been proposed in, for example, German Pat. No. 521,946 and Offenlegungschrift 2,132,372 to fill a pane interstice with a colorless fluid and to heat the fluid by an electrical heating element wherein a heat distribution takes place by convection. A disadvantage of these proposals resides in the fact that with present customary pane dimensions, convection is no longer adequate to ensure a uniform heat distribution so that forced circulation becomes necessary to increase heat transfer and to attain a uniform temperature distribution in the pane. Consequently, these proposals makes the heating unit expensive and more troubleprone.

Additionally, in Offenlegungschrift 1,956,182, it is proposed to heat an electrically-conductive fluid by the passage of an electric current; however, this proposal appears practically infeasible since such fluids tends to decompose when an electric current passes therethrough.

The aim underlying the present invention essentially resides in providing a method for heating a viewing pane consisting of compound glass from an interstices between the panes of glass as well as a pane heatable from the interstices wherein a large amount of heat can be transmitted with an extraordinarily-uniform temperature distribution over the entire pane.

In accordance with advantageous features of the method of the present invention, a multiple glass pane is supplied into the interstices between the glass panes by effecting the heat supply by vapors condensing between the panes. Advantageously, the heat is supplied by vapors condensing at between 20°-60° C.

In accordance with further features of the present invention, the heat is supplied by the condensation of halogenated hydrocarbon vapors and the interstices between the panes constitutes a condensation zone of a flat heat pipe.

In accordance with the glass pane construction of the present invention, the glass surfaces facing the condensation zones are roughened by, for example, optical refining.

Advantageously, the individual panes of the multiple glass pane have, in accordance with the present invention, a mutual spacing of 2-5 mm.

The interstices between two panes of a double-glass pane constitutes the condensation zone of a large area heat pipe. When using triple-glass panes, two interstices are obtained of which only one but preferably both of the interstices can be fashioned as the condensation zone.

In a case of triple-glass panes, an advantage is provided that a central pane may be made especially thick and resistant so as to result in, for example, bullet-proof glass panes. The two other panes facing toward the outside and toward the interior can then be fashioned thinner so as to attain a satisfactory heat flow toward the outside. The panes are heated by the heat of condensation of a vapor of a vaporized liquid condensing on these panes wih the condensed liquid running back due to the effect of gravity. At a lower end of the pane, the condensate is directly revaporized or conventionally absorbed by a wick and conducted by capillary effect or action to the vaporizing zone where it is revaporized. The construction and mode of operation of heat pipes is generally known and is described in detail in, for example, Perry, *Chemical Engineers' Handbook*, Chapter 9, pages 47, 48, McGraw-Hill, 1973.

The optical refining of the glass surfaces, that is, vapor deposition of a reflection-reducing coating, improves and enhances the backflow of the condensate and the liquid-film formation on the glass surface. The slight roughening of the glass surfaces can also generally be accomplished by slight chemical etching.

To avoid the possible danger of being burned when touching the pane and to preclude unnecessary thermal stresses during the heating-up process, as noted hereinabove, in accordance with the present invention, liquids are employed the vapor of which condenses at an acceptable pressure of, for example, 0.2-3 bar at about 20°-60° C. Too high a pressure would represent a risk in case of breakage and the window. Suitable liquids are halogenated, especially fluorinated hydrocarbons boiling in the appropriate temperature range since they are noncombustible and practically nontoxic. Since heat pipes are extraordinarily efficient, an amount of about 10-50 cc per $m^2$ of window is generally sufficient as the liquid filling for a condensation zone to transfer the required amount of heat.

As indicated hereinabove, a spacing of the individual panes of about 2-5 mm is advantageous and, as can readily be appreciated, the spacing of the panes of the compound glass pane from one another should be maximally small to avoid reflections on the individual panes but should also be sufficiently wide so as to not impede the flow of liquid vapors and returning condensate. If the insides of the glass panes are optically refined, which simultaneously enhances the reflux of condensate, the spacing between the individual panes can be chosen so as to be larger than 2-5 mm without incurring any difficulties.

The individual panes of the compound glass pane may, in accordance with the present invention, be made of a prestressed safety glass; however, it is also possible to use multiple-layered individual panes, for example, of sandwich safety glass. In the latter case, the heat flow from the inside toward the outside may be affected in a controlled fashion by varying a thickness of the glass layers and of the synthetic resin layers joining the same so that different temperature levels may be set at window surfaces pointing toward the passenger compartment and those pointing toward the outside. Of course, this is even simpler in the case of triple-glass panes with two condensation zones since these can be maintained at differing temperature levels without difficulties.

Since varying pressures may occur during the operation of a heat pipe, depending upon the heating medium, advantageously in accordance with further features of the present invention, two halves of the pane may be joined at several points on the glass surface by ribs or nubs, wherein these junction points suitably are located so that they interfere minimally with vision through the pane.

It is also possible in accordance with the present invention to prestress the panes so that they assume the desired shape under the operation pressure by "bloating". With double-glass panes consisting of relatively-thick armored glass, which is especially difficult to heat with the use of conventional methods and wherein the heating method of the present invention is thus particularly advantageous, such measures, however, are generally unnecessary due to the strength of material.

In accordance with the present invention, the supply of heat to the heat pipe may be effected by coupling the vaporizing section of the heat pipe with a coolant circulation system or by exposing the vaporizing section to hot exhaust gases; however, it is also possible to heat the vaporizer by means of an interposed further heat pipe. Additionally, the vaporizer may also be heated electrically by, for example, heating rods.

Accordingly, it is an object to the present invention to provide a compound glass pane construction and a process for heating the same which avoids, by simple means, shortcomings and disadvantages encountered in the prior art.

Another object of the present invention resides in providing a compound glass pane construction and method for heating the same which ensures uniform temperature distribution and minimizes if not avoids the danger of local hot spots.

Yet another object of the present invention resides in providing a compound glass pane construction and a method for heating the same which is simple in construction and therefore relatively-inexpensive to manufacture.

A further object of the present invention resides in providing a compound glass pane construction and a method for heating the same which minimizes the currents of thermal stresses in the glass panes.

A still further object of the present invention resides in providing a compound glass pane construction and method for heating the same of which it is possible to achieve over an entire window an extraordinarily-uniform, practically isothermic temperature distribution which leads to a high effectiveness of the heating while minimizing thermal stresses in the glass.

Another object of the present invention resides in providing a compound glass pane construction and method for heating the same which is particularly suitable for especially thick, for example, bulletproof panes for military vehicles and aircraft.

Yet another object of the present invention resides in providing a compound glass pane construction and method for heating the same which, as a result of the practical isothermic temperature distribution, creates a comfortable indoor climate in a vehicle since a feeling of comfort is substantially affected by the temperature of the walls since cold walls render an actually-warm room uncomfortable.

A still further object of the present invention resides in providing a compound glass pane construction and method for heating the same which eliminates the previously-required vigorous air currents for window defrosting.

These and other objects, features, and advantages of the present invention will become more apparent from the following description when taken in connection with the accompanying drawings which shown, for purposes of illustration only, two embodiments in accordance with the present invention, and wherein.

Figure 1:
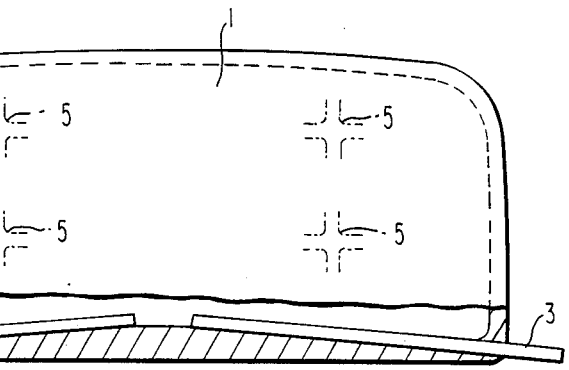
FIG. 1 is a partial cross-sectional view of a double-glass pane construction with two heating elements constructed in accordance with the present invention.
Figure 2:
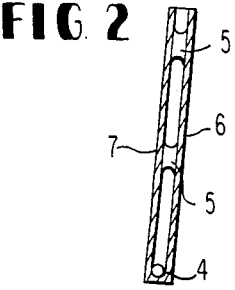
FIG. 2 is a partial cross-sectional view through the pane of FIG. 1.

Referring now to the drawings wherein like reference numerals are used throughout the various views to designate like parts and, more particularly, to FIGS. 1 and 2, according to these figures, a double-glass panel 1 is formed of two individual glass panes 6,7 spaced from each other so as to form an interstice, with two heating elements 3,4 projecting into the interstices of the double-glass pane 1. The heating elements 3,4 are adapted to vaporize the vapors which have condensed in the interstices between the panes 6,7 and have flowed downwardly. The heating elements 3,4 may, for example, be ends of a heat pipe or an electric heating rod. The heating elements are vaporizer members of the double-glass pane 1, with the double-glass pane 1 being fashioned as a flat or large area heat pump.

As shown in FIG. 2, the individual panes 6,7 of the double-glass pane 1 are joined at several reinforcement points 5.

Figure 3:
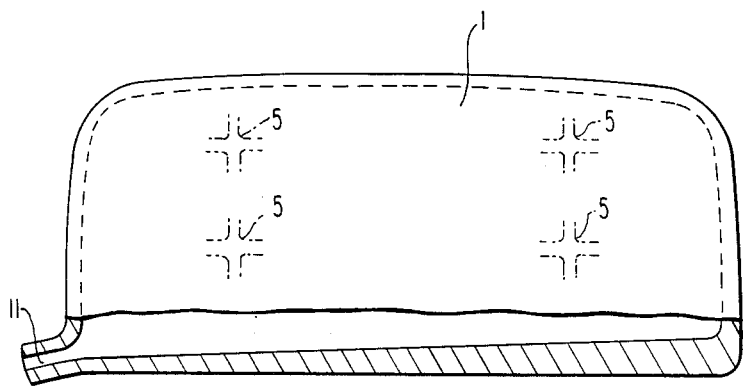
FIG. 3 is a partial cross-sectional view of another embodiment of a double-glass pane construction in accordance with the present invention.

As shown in FIG. 3, a pipe 11 is provided through which a liquid which has condensed in the interstices between the panes of the double-glass pane 1' is returned by a wick effect into a vaporizing zone (not shown) and a fresh vapor is transported from the vaporizing zone to the interstices between the panes.

Figure 4:
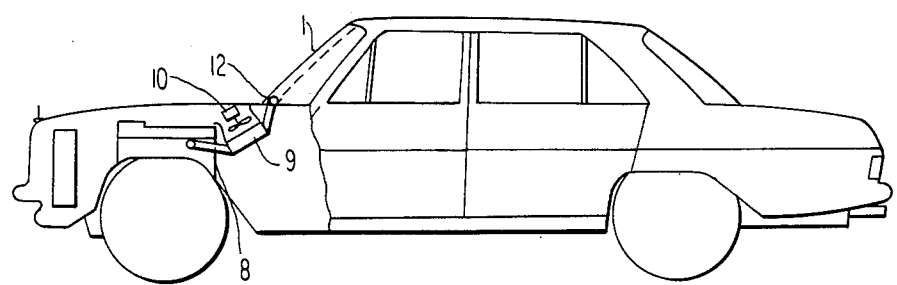
FIG. 4 is a schematic view of an installation of the glass pane construction of the present invention as a front window in a motor vehicle.

FIG. 4 provides an example of the installation of a double-glass pane 1 or 1' in a motor vehicle. As shown in FIG. 4, the vaporizer is connected to a coolant circulatory system, for example, the water cycle of a heater of the vehicle with a pipe 12, conveying vapor to the windshield 1 and liquid away from the windshield. A hot water conduit 8 extends from the engine into a heat exchanger 9 with a fan 10 of the vehicle heater cooperating with the heat exchanger 9.

While we have shown and described only two embodiments in accordance with the present invention, it is understood that the same is not limited thereto but is susceptible of numerous changes and modifications as known to those of ordinary skill in the art, and we therefore do not wish to be limited to the details shown and described herein but intend to cover all such changes and modifications known to those skilled in the art.

What is claimed is:

1. A process for heating a multiple-glass window pane with vapors in an interstice therebetween for the purpose of melting snow, ice or the like located on the outside of one outside pane and for defrosting the outside of another outside pane, comprising the steps of:
   supplying heat directly into said interstice between the panes, and
   heating the panes of the multiple-glass pane by condensing said vapors thereon.

2. A process according to claim 1, characterized in that the vapors condense at between 20°–60° C.

3. A process according to one of claim 1, characterized in that heat is supplied by condensation of halogenated hydrocarbon vapors.

4. A multiple-glass window pane with heating means to melt snow, ice or the like located on the outside of one outside pane and for defrosting the outside of another outside pane by heating from an interstice between the panes, comprising:
   means for forming the interstice between the panes into a condensation zone of a substantially-flat heat pipe, and said means comprising
   means for heating the interstice other than through said panes for the purpose of heating said panes from the interstice.

5. A multiple-glass window pane adapted to be heated from an interstice between the panes comprising:
   means for forming the interstice between the panes into a condensation zone of a substantially-flat heat pipe, and said means comprising
   means for heating the interstice other than through said panes for the purpose of heating said panes from the interstice
   wherein surfaces of the panes facing the condensation zone are roughened.

6. A multiple-glass pane according to claim 5, characterized in that the roughening of surfaces of the panes facing the condensation zone is achieved by optical refining.

7. A multiple-glass pane according to claim 6, characterized in that individual panes of the multiple-glass pane are mutually spaced at between 2–5 mm.

8. A multiple-glass pane according to one of claim 4 characterized in that means are provided for reinforcing portions of the multiple-pane glass.

9. A multiple-glass pane according to claim 8, characterized in that said means for forming the interstices into a condensation zone includes at least one heating element projected into the interstices, and a vaporizable liquid is provided in the interstices.

10. A multiple-glass pane according to claim 9, characterized in that the at least one heating element is a heat pipe means.

11. A multiple-glass pane according to claim 10, characterized in that revaporizable liquid is a halogenated hydrocarbon.

12. A multiple-glass pane according to claim 11, characterized in that the halogenated hydrocarbon supplies vapors condensing at between 20°–60° C.

13. A multiple-glass pane according to claim 12, characterized in that the multiple-glass pane includes two individual panes.

14. A multiple-glass according to claim 13, characterized in that the multiple-glass pane includes at least three individual panes.

15. A multiple-glass pane according to claim 14, characterized in that the individual layers are of a varying thickness so as to obtain differing temperature levels at the respective panes.

16. A multiple-glass pane according to one of claims claim 4, characterized in that the multiple-glass pane includes at least two individual panes.

17. A multiple-glass pane according to claim 16, characterized in that the multiple-glass pane is installed in a motor vehicle.

18. A multiple-glass pane according to claim 17, characterized in that said means for forming the interstices into a condensation zone includes at least one heating element projected into the interstices, and a vaporizable liquid is provided in the interstices.

19. A multiple-glass pane according to claim 18, characterized in that the at least one heating element is a heat pipe means.

20. A multiple-glass pane according to claim 19, characterized in that revaporizable liquid is a halogenated hydrocarbon.

21. A multiple-glass pane according to claim 17, characterized in that the at least one heating element is an electric heating rod.

22. A multiple-glass pane according to one of claim 4, characterized in that the multiple-glass pane includes at least three individual panes.

23. A multiple-glass pane according to claim 22, characterized in that the individual layers are of a varying thickness so as to obtain differing temperature levels at the respective panes.

24. A multiple-glass pane according to one of claim 4, characterized in that said means for forming the interstices into a condensation zone includes at least one heating element projected into the interstices, and a vaporizable liquid is provided in the interstices.

25. The process according to claim 2, wherein heat is supplied by condensation of halogenated hydrocarbon vapors.

26. The multiple-glass pane according to claim 5, wherein means are provided for reinforcing portions of the multiple-pane glass.

27. The multiple-glass pane according to claim 5, wherein the multiple-glass pane includes at least two individual panes.

28. The multiple-glass pane according to claim 5, wherein the multiple-glass pane includes at least three individual panes.

29. The multiple-glass pane according to claim 5, wherein said means for forming the interstices into a condensation zone includes at least one heating element projected into the interstices, and a vaporizable liquid is provided in the interstices.

* * * * *